(12) United States Patent
Dreyer et al.

(10) Patent No.: US 6,933,075 B2
(45) Date of Patent: Aug. 23, 2005

(54) SLEEVE SEPARATOR FOR A LEAD PLATE

(75) Inventors: Daniel Dreyer, Mackenheim (FR); Jean-Luc Koch, Still (FR)

(73) Assignee: TBS Engineering Limited, Cheltenham (GB)

( * ) Notice: Subject to any disclaimer, the term of this patent is extended or adjusted under 35 U.S.C. 154(b) by 77 days.

(21) Appl. No.: 10/297,362

(22) PCT Filed: Apr. 5, 2001

(86) PCT No.: PCT/EP01/03894
§ 371 (c)(1),
(2), (4) Date: Mar. 5, 2003

(87) PCT Pub. No.: WO01/95413
PCT Pub. Date: Dec. 13, 2001

(65) Prior Publication Data
US 2003/0162089 A1 Aug. 28, 2003

(30) Foreign Application Priority Data
Jun. 7, 2000 (DE) .......................... 100 28 084

(51) Int. Cl.[7] .............................................. H01M 2/18
(52) U.S. Cl. ........................ 429/139; 429/136; 429/137
(58) Field of Search .................................. 429/136–140

(56) References Cited

U.S. PATENT DOCUMENTS

| | | | | |
|---|---|---|---|---|
| 4,552,823 A | * | 11/1985 | Wozniak ....................... 429/81 |
| 4,680,242 A | * | 7/1987 | Simonton et al. ........... 429/136 |
| 5,558,952 A | * | 9/1996 | Knauer ........................ 429/139 |

FOREIGN PATENT DOCUMENTS

| | | |
|---|---|---|
| DE | 2715713 | 1/1978 |
| DE | 8702097.1 | 7/1987 |
| DE | 3610952 | 10/1987 |
| EP | 60050859 | 3/1985 |
| EP | 60133654 | 7/1985 |
| EP | 63055851 | 3/1988 |

* cited by examiner

Primary Examiner—Mark Ruthkosky

(57) ABSTRACT

The invention relates to a sleeve separator for a lead plate (2) of a lead-acid accumulator. The sleeve separator surrounds the front and rear sides and lower and bottom edges of said lead plate. The invention is characterised in that the separator material (6) on the top edge of the lead plate (2) and the sleeve is folded away from the lead plate on one side approximately at right angles, so that it projects sideways; in that the separator material (8) on the other, opposite sleeve side is also folded over the upper edge of the lead plate at right angles and also projects sideways from the side of the sleeve; and in that the two separator sections which project sideways at approximate right angles from the side of the sleeve and which are superimposed, are interconnected by a joint (7).

3 Claims, 11 Drawing Sheets

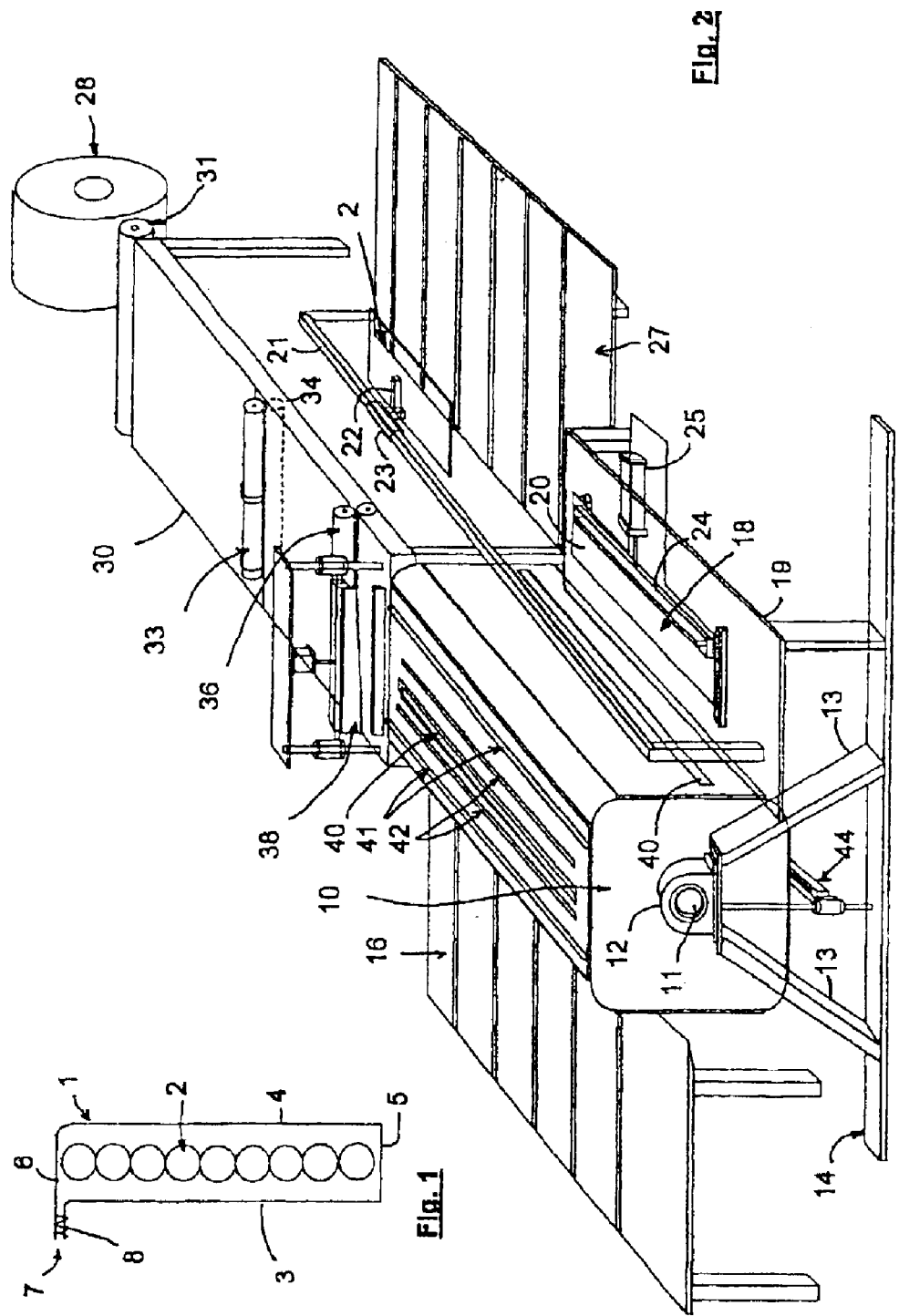

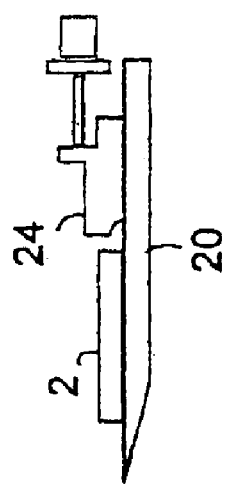
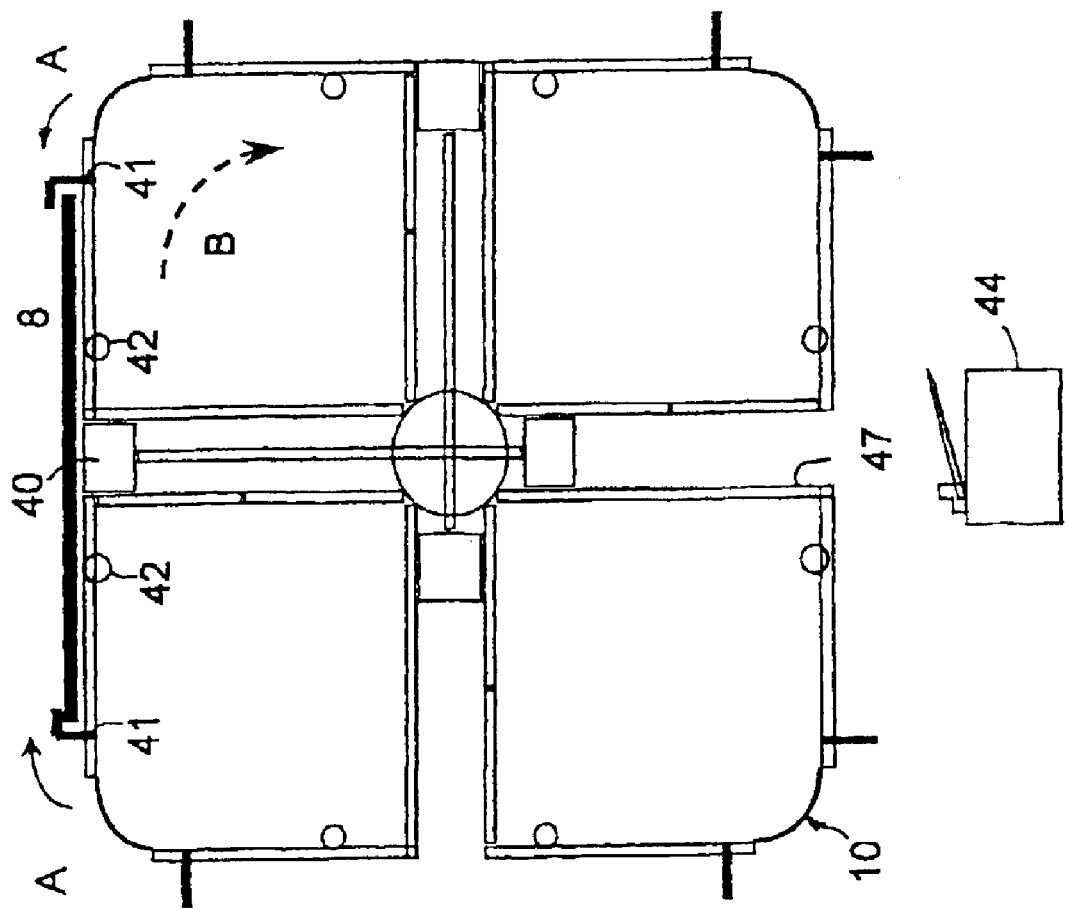
Fig. 4

SLEEVE SEPARATOR FOR A LEAD PLATE

The invention relates to a sleeve separator for enclosing battery plates of a lead-acid accumulator and a device for producing such sleeve separators.

Battery separators are used in accumulators in order to prevent direct contact and therefore short circuits between the electrode plates. The separators are produced from porous, acid- and oxidation-resistant materials, the pore size being selected such that it permits an ionic current flow through the membrane but prevents the passage of through growths and particles which have been separated from the accumulator plates.

A distinction is drawn between macroporous separators having an average pore diameter of about 10 to 30 $\mu$m and microporous separators having an average pore diameter of less than 1 $\mu$m. The risk of the penetration of particles and through growths, and therefore the risk of short circuits, is particularly small in the case of microporous separators because of the small pore size. Lead accumulators fitted with microporous separators therefore usually have an increased life time.

Separators are generally used in the form of plug-in or sleeve separators. Plug-in separators are produced as piece parts and cut to size to the necessary height and width by the separator manufacturer. They are relatively stiff and, during the battery production, are introduced as such between the accumulator plates. Sleeve separators are generally fabricated as products on the roll having the desired width and are only cut to a predefined length and shaped to form sleeves in a fully automatic process at the battery producer. These sleeves, closed on two sides, are used to hold the accumulator plates.

It is an object of the invention to provide a sleeve closed on two sides for a separator, which can be produced fully automatically and can be folded and closed directly around the accumulator plate. It is also an object of the invention to provide a device for producing a sleeve separator of this type.

In order to achieve the first-named object, use is made of a sleeve separator for a lead plate of a lead-acid accumulator, which surrounds the front side and the rear side and also the bottom edge and the top edge of the lead plate, and which is characterized in that the separator material at the top edge of the lead plate and of the sleeve is folded away from the lead plate, projecting laterally approximately at right angles on one side, in that the separator material of the opposite other sleeve side is likewise folded at right angles over the top edge of the lead plate and likewise projects laterally from the sleeve side, and in that the two separator sections projecting laterally approximately at right angles from the sleeve side and resting on each other are connected to each other.

This means that the sleeve separator is folded around a lead plate in a first step and, in a second step, can be closed along a laterally projecting longitudinal edge, for which purpose a production machine that operates fully automatically can be used.

In order to achieve the further object, use is made of a device for producing sleeve separators for enclosing battery plates of a lead-acid accumulator, having a rotary table which can be rotated about a horizontal axis in steps of 90° in each case and has four surfaces in each case forming the sides of a square, which are each provided in the area of their edges with holding devices that can be activated to hold the separator material, while, in the central area of each surface, a surface section which can be retracted toward the axis is provided, having a lead plate feed device which feeds the lead plates to be enclosed laterally approximately at the height of the axis of the rotary table, having a pushing device for pushing in the lead plates fed to the rotary table in the direction of the rotary table axis with simultaneous movement of the central area of the associated surface, which can be retracted in the direction of the rotary table axis, having a first folding device for folding the separator material under and over the lead plate while the latter is pushed into the rotary table by the pusher, having a second folding device which folds over the edges of the sleeve separator folded by the first folding device at right angles and projecting laterally beyond the sleeve separator, having a closing device for closing the sleeve edges folded by the second folding device, and having an expulsion device for expelling the closed sleeve separator containing the lead plate from the rotary table.

Advantageous refinements of the invention form the subject matter of the subclaims.

The invention will be explained in more detail below using figures, in which:

FIG. 1 shows a schematic side view of a sleeve separator;

FIG. 2 shows a schematic illustration of a device for producing the sleeve separator of FIG. 1; and FIGS. 3 to 12 show the individual phases in the production of the sleeve separator according to the invention.

Figure 3:
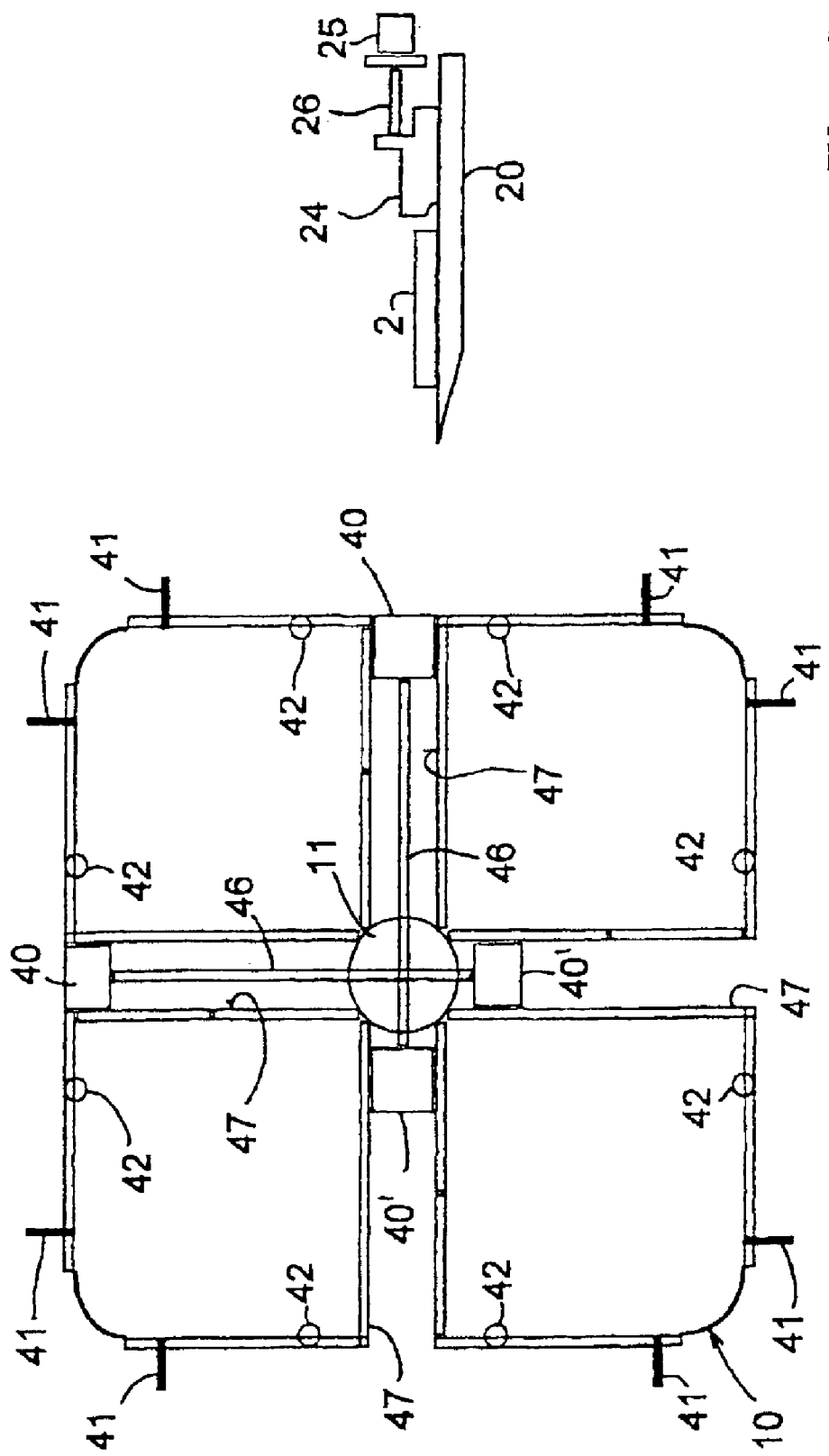

FIG. 1 shows a schematic side view of a sleeve separator 1 for enclosing a lead plate 2 of a lead-acid accumulator, not illustrated. The sleeve separator has a front side 3 and a rear side 4, which are connected to each other by a bottom edge 5 at the bottom edge of the lead plate 2. The front side 3, the rear side 4 and the bottom edge 5 of the sleeve separator 1 are produced from separator material and are connected to one another in one piece by folding a separator material web. Before being closed by a seam 7, the sleeve separator 1 is open at its top edge 6, in order to be able to introduce the lead plate 2 from there. The side walls of the sleeve separator are open, so that the lead plate 2 is visible from both sides, as illustrated in FIG. 1.

A significant feature of the invention now consists in the fact that the front edge 3 of the sleeve separator 1 is folded over projecting outward approximately at right angles in the area of the top edge 6, and therefore forms a web 8 oriented away from the lead plate 2 and the rear side 4. The upper end of the rear side 4 is folded in the same direction, so that it covers the lead plate 2 and in the process forms the top edge 6. The top edge 6 extends over the edge of the front side 3, folded over outward at right angles, to the extent required for the formation of a seam 7, which reliably connects the front side 3 to the rear side 4.

In one embodiment, the seam 7 is formed by welding, in another embodiment by mechanical crimping.

The production of a welded connection is familiar to those skilled in the art. Depending on the separator material, an appropriate sealing bar is inserted, which softens the material, presses it against itself and allows it to solidify while maintaining a suitable pressure.

A further possible way of closing the sleeve separator 1 reliably by means of a seam 7 consists in a connection by means of mechanical crimping, the web 8 projecting laterally from the front side 3 being produced between two intermeshing gears or a gear meshing with a rack or else by two racks pressed against each other. If a suitable tooth shape with a complementary matching shape is chosen and if a pressure suitable for connecting the two separator sides is applied, the separator material is pressed against itself in the manner of a crimping operation in such a way that a reliably closed seam 7 is produced. The gears and/or rack(s) have or has straight teeth in one embodiment, inclined teeth in another, for example at an angle of 10° to 30°, preferably 20°.

FIG. 2 shows a device for producing a sleeve separator 1 according to FIG. 1, having a rotary table 10 which can be rotated about a horizontal axis 11. The axis 11 is carried by a bearing 12 which is mounted on supports 13 belonging to a frame 14. The rotary table 10 has the form of a drum with a square cross section and rounded corners, as can easily be seen in the drawing. In the basic position of the rotary table, its top side and bottom side are therefore aligned horizontally, while the alignment of the side surfaces is vertical. During rotation of the rotary table 10 through 90° in each case by means of a motor, not illustrated, which is arranged on the side of the axis 11 opposite the bearing 12, the side walls of the rotary table 10 are always aligned either horizontally or vertically.

A glance at the drawing reveals, on the left-hand side of the rotary table 10, a conveying device 16, illustrated schematically, for transporting the finished sleeve separators 1 away. On the opposite, right-hand side of the rotary table 10, a pushing device 18 is mounted on a table 19, which is likewise part of the frame 14. Mounted on the table 19 is a sliding table 20, which extends parallel to the axis 11 of the rotary table 10 and on which the lead plates 2 fed in by a gripper 22 are deposited, in order to be pushed at right angles toward the rotary table 10 by a pusher 24 in a manner still to be explained later. The actuation of the pusher 24 is carried out by a cylinder 25, which is preferably a pneumatic cylinder.

A gripper 22 used to feed in the lead plates 2 is carried by a sleeve 23 which can be displaced on a crossbeam 21 in the longitudinal direction of the crossbeam 21. For this purpose, the crossbeam 21 is arranged parallel to the rotary table 10, as shown in FIG. 2. However, a different alignment of the crossbeam is also possible, for example transversely with respect to the rotary table 10, which does not signify a difficulty for those skilled in the art. A vertical strut of the crossbeam 21 is therefore fixed vertically on the table 19 on the front side of FIG. 2, while the opposite, rear strut is fixed to the rear end of the frame 14 in a manner which is not shown but is known. A familiar way of fixing the crossbeam 21 to the frame 14 is the welding of these parts.

Arranged behind the table 19, in the direction of view of FIG. 2, is a plate conveyor 27, which conveys the lead plates 2 from a plate stack or another storage location to the rotary table, in order there to be gripped by the gripper 22 and transferred to the pushing device 18. As viewed in the transport direction of the lead plates 2, the plate conveyor 27 is therefore in front of the sliding table 20.

FIG. 2 further shows, in schematic form, a separator material roll 28, from which the separator material 8 is fed to the rotary table 10 as a coherent web. The web material is fed over a feed table 30, in front of which there is a guide roll 31. After the guide roll 31, the web material runs through between a pair of rolls, of which the upper roll is a grooved body 33, which interacts with a back-pressure roll 34 and is used to produce grooved lines in the web material of the separator, along which lines the sleeve separator 1 can be folded on the rotary table 10. After passing through the grooved rolls 33, 34, the separator web material runs into the gap between a pair of conveyor rolls 36 which are used to feed the separator material 8 in a controlled manner to the surface of the rotary table 10 respectively located at the top or in the 12 o'clock position.

Provided at the end of the feed table 30, and therefore in the immediate vicinity of the rotary table 10, is a cutting device 38, whose upper knife can be moved against a lower bar in a guided way in the manner of a guillotine and therefore cuts off the separator web material 8 in accordance with the length of a battery plate 2.

In connection with the surface of the rotary table 10 which is currently located at the top, it is further possible to see a central area 40, holding devices 41 and folding devices 42, which will be explained in more detail below. Furthermore, at the front end below the rotary table 10 and in the vicinity of the bearing 12, FIG. 2 shows a welding device 44 for producing the seam 7 of the sleeve separator 1.

It is pointed out that the device illustrated in FIG. 2 is shown only schematically, which is expressed in particular by the fact that no load-bearing construction for the separator material roll 28 is illustrated. However, it is clear to those skilled in the art how the suspension of such a material roll and all the other components not illustrated expressly in detail would have to be implemented.

Mode of Operation of the Device

The mode of operation of the device for producing sleeve separators 1 will now be explained in more detail by using a number of figures, which show the individual steps of the production method. The illustration is schematic and, for reasons of clarity, dispenses with constructional details. Identical parts are otherwise provided with the same reference symbols and, if necessary, are distinguished by an apostrophe.

FIG. 3 shows the rotary table 10 of FIG. 2 in the form of a schematic vertical section, before a separator material web section is fed in. Arranged on the right beside the rotary table 10 is the sliding table 20, on which a lead plate 2 is already resting. It is additionally possible to see the pusher 24, which can be moved forward and back in the direction of the axis 11 by a piston rod 26 of the cylinder 25. FIG. 3 also shows the holding devices 41 opened in the 12 o'clock position and the folding devices 42. It is also possible to see the retractable central areas 40 of the side walls of the rotary table 10, which are coupled to one another by connecting rods 46 in such a way that in each case two diametrically opposite central areas 40 can be moved only jointly. The movement of the central areas 40 takes place in guide slots 47, which cross at the center of the rotary table 10 and ensure that, whenever a first central area 40 is aligned with the surface of a side wall, the opposite central area 40' is pulled back in the slot 47 and therefore permits the insertion of a lead plate 2.

Since identical parts in the following figures are consistently provided with the same reference symbols, for reasons of clarity only those reference symbols to which the respective description relates in particular are shown.

FIG. 4 shows the rotary table 10 after separator material 8 has been fed in and cut off, the holding devices 41 already having their free ends pivoted over the separator material 8 in the direction of the arrows A and therefore holding said material firmly on the rotary table 10. The folding devices 42 are still retracted in this state and are aligned with the top side of the side wall, specifically in the same way as done by the central area 40. In addition, the welding device 44 is illustrated schematically under the rotary table 10. In the next step, the rotary table 10 is rotated through 90° in the clockwise direction in the direction of the arrow B and into the 3 o'clock position.

Figure 5:
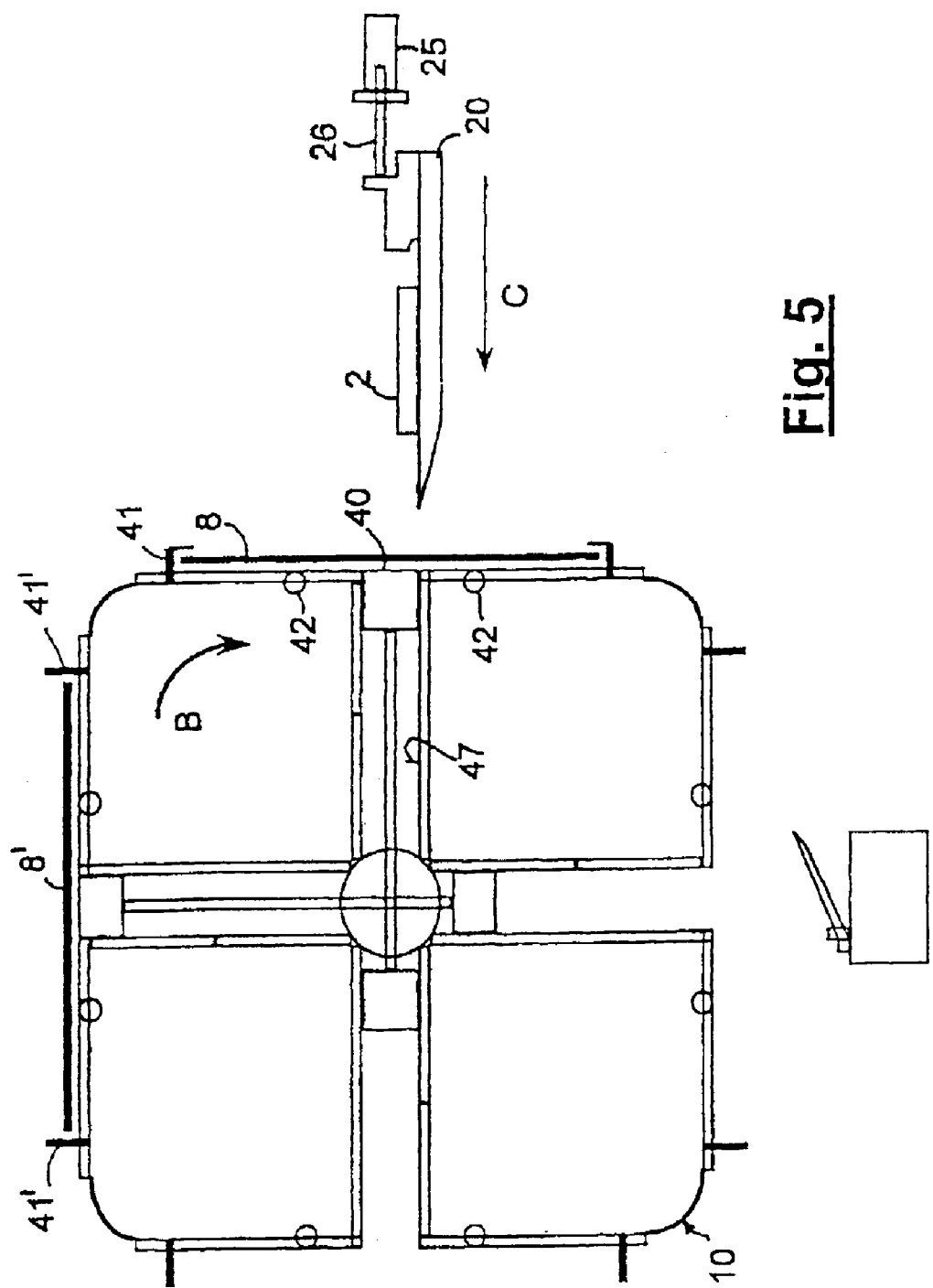

FIG. 5 shows the rotary table 10 rotated in the direction of the arrow B into the 3 o'clock position, in which the separator material 8 is now held vertically on the side surface by the holding devices 41, while the folding devices 42 have not yet been actuated. By contrast, a lateral feed movement for the lead plate 2, together with the sliding table 20, is already being carried out in the direction of the arrow C. This movement is effected by extending the piston rod 26 of the cylinder 25. In FIG. 5, however, the central area 40 is still aligned with the side wall and therefore in the fully outwardly moved position in the guide slot 47. In this position of the rotary table 10, a further piece of separator material 8' can already be fed to the holding devices 41', which are still open.

Figure 6:
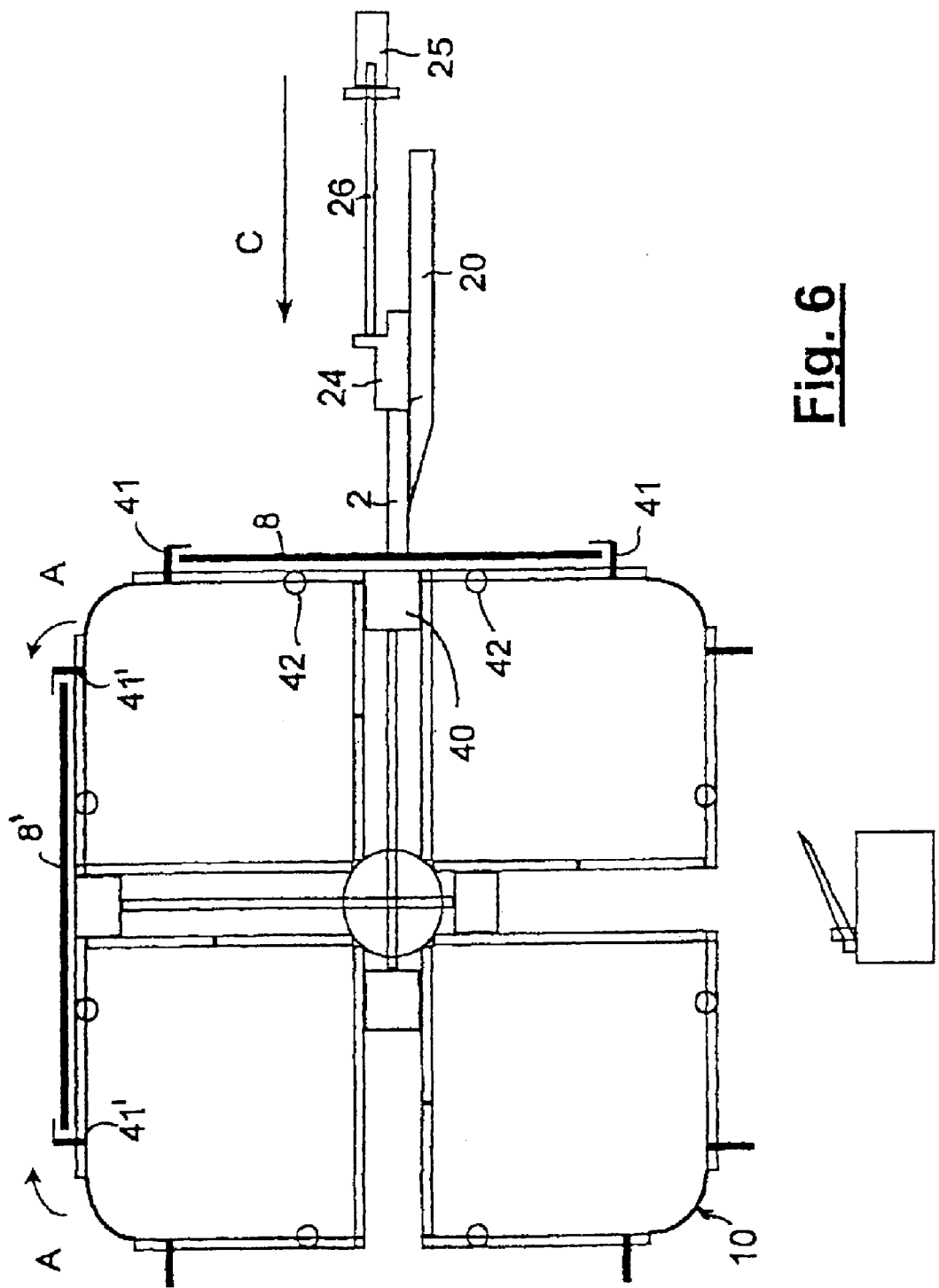

In FIG. 6, the holding devices 41' now located at the top close in the direction of the arrows A in order to hold the new piece of separator material 8' firmly on the rotary table. At the same time, the piston rod 26 of the cylinder 25 is extended fully in the direction of the arrow C, so that the lead plate 2 pushed on the sliding table 20 by the pusher 24 toward the rotary table 10 just touches the separator material 8 somewhat below its center.

Figure 7:
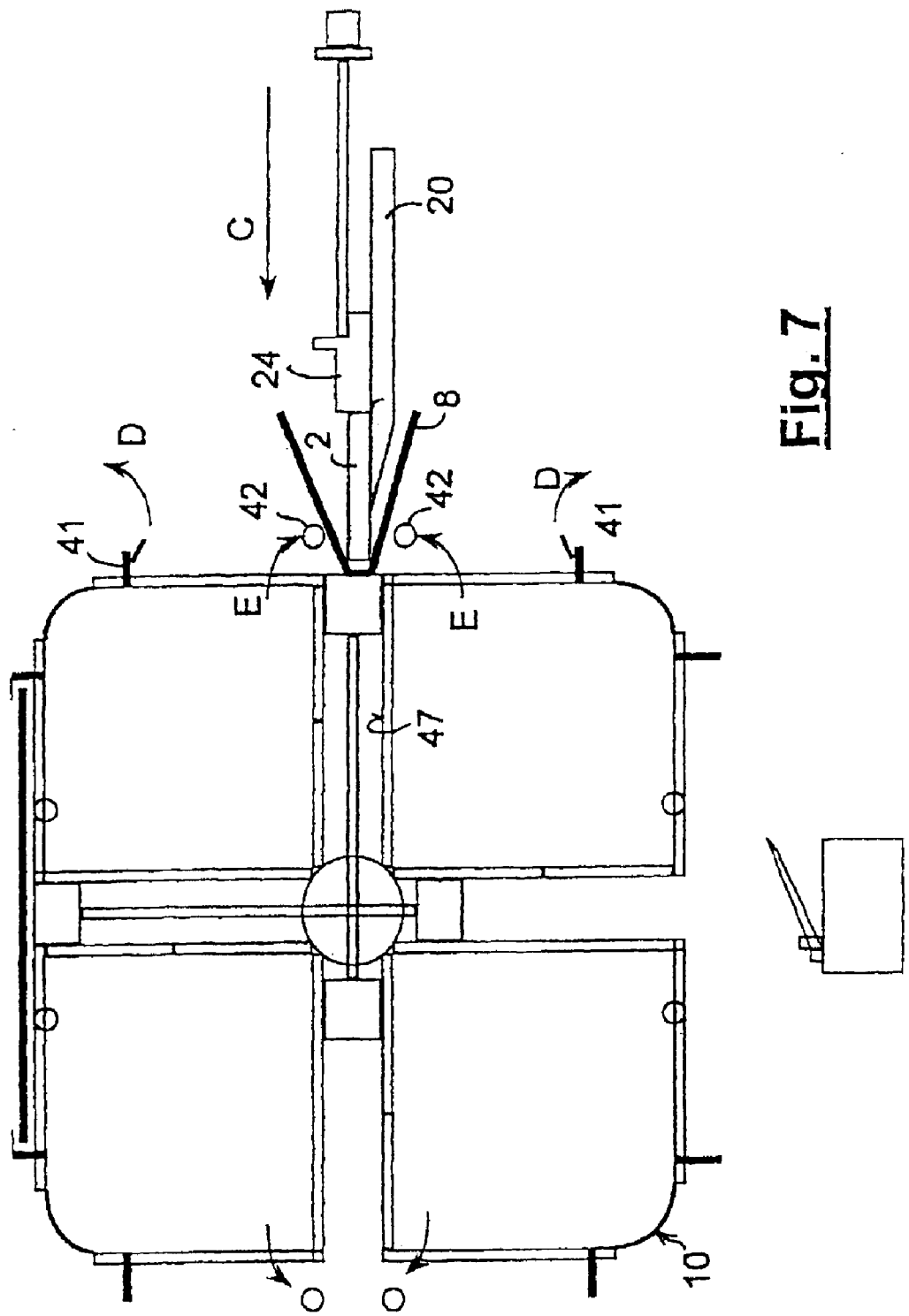

In the operation illustrated in FIG. 7, the holding devices 41 open in the direction of the arrows D, while at the same time the lead plate 2 is pushed into the guide slot 47 by the pusher 24. In the process, the moveable central area 40 is pushed back in the guide slot 47, while at the same time the folding devices 42, which in one embodiment are two parallel rods with circular cross section, are pivoted up out of the side wall of the rotary table 10 in the direction of the arrows E and against the lead plate 2. As a result, they force the separator material 8 against the lead plate 2 and form a sleeve in the process.

Figure 8:
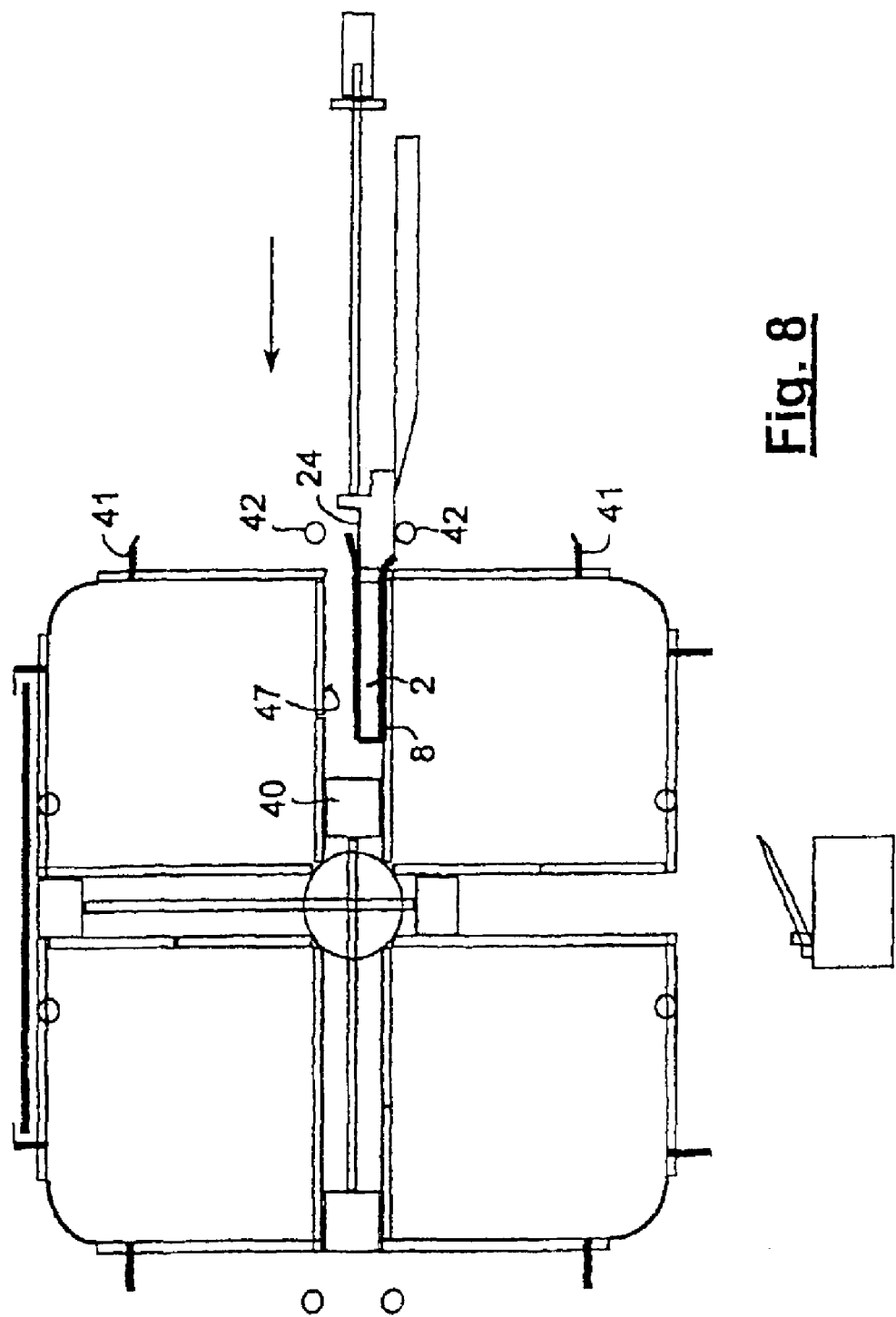

FIG. 8 shows the lead plate 2 pushed completely into the guide slot 47 by the pusher 24, said lead plate 2 already being enclosed on three sides by the separator material 8 when in this position. The central area 40 has in the process been pushed completely into the guide slot 47.

Figure 9:
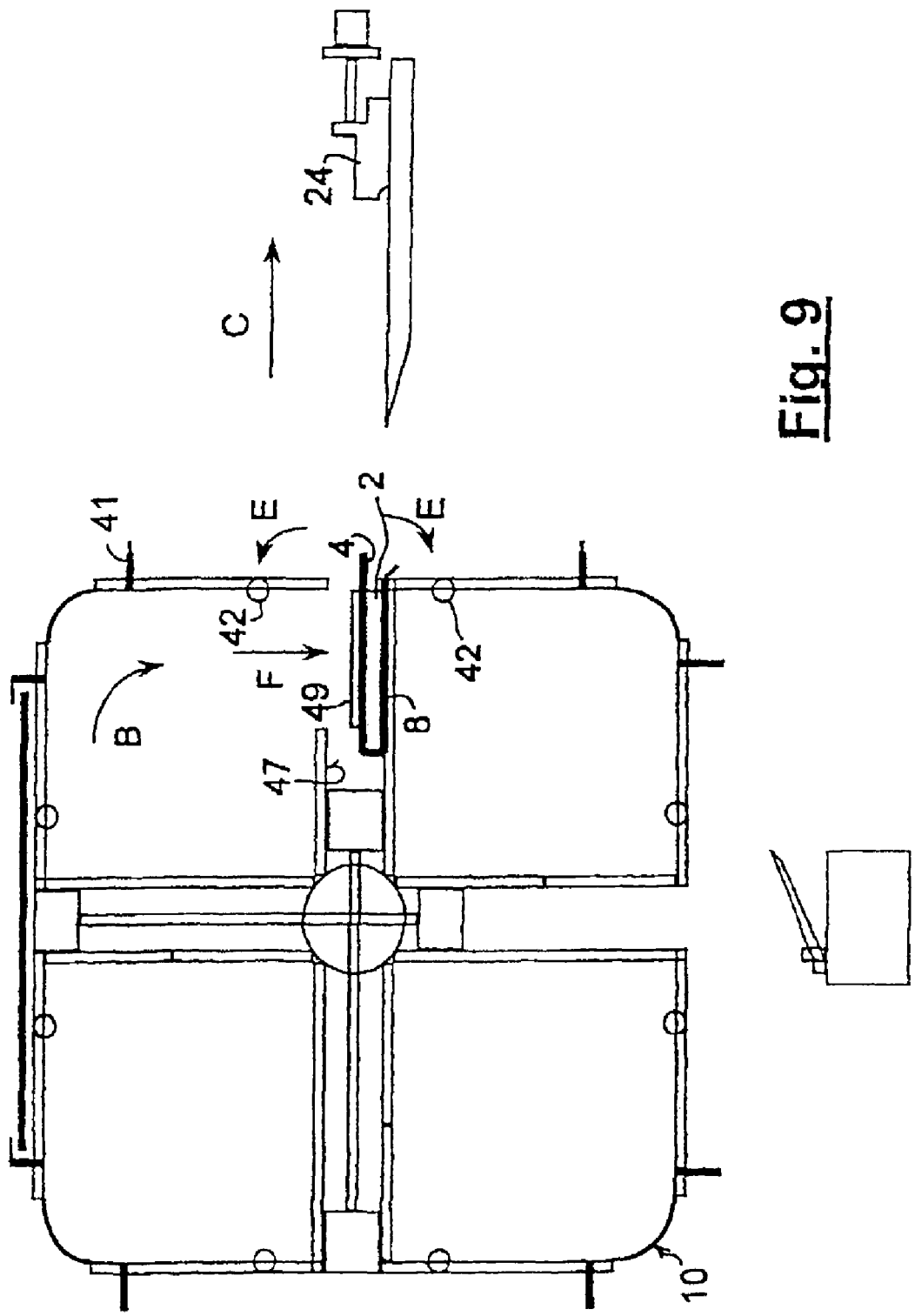

The next production step is illustrated in FIG. 9, the pusher 24 being pulled back from the rotary table 10 in the direction of the arrow C', while a wall section 49 of the guide slot 47 is moved against the battery plate 2 in the direction of the arrow F in the manner of a punch and therefore presses the rear side 4 of the separator material 8 against the lead plate 2. The holding devices 41 are still open, while the folding devices 42 have been pivoted back into the side wall again in the direction of the arrows E'.

Figure 10:
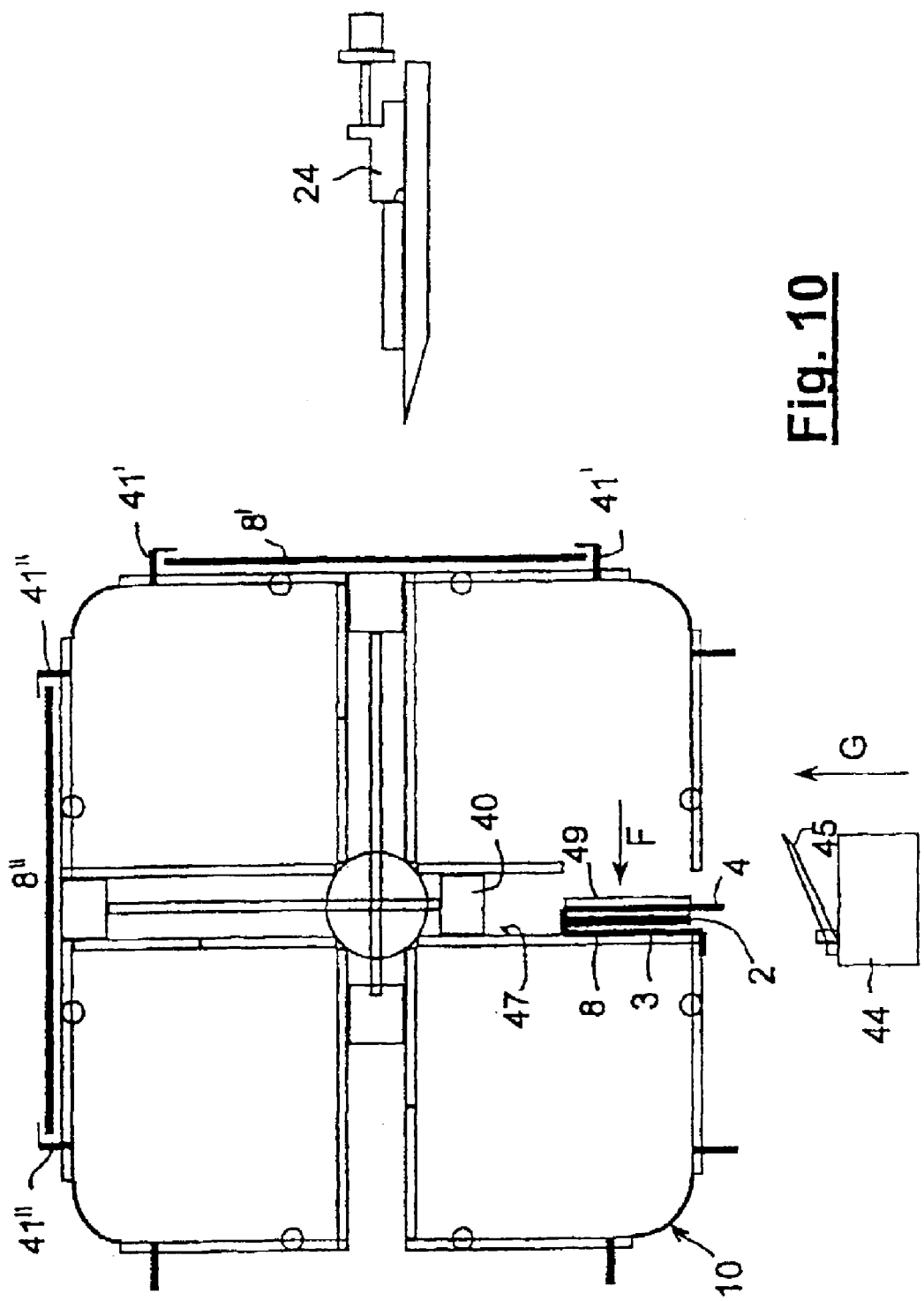

FIG. 10 shows the third position of the rotary table 10, in which the latter has been rotated by twice 90° in the clockwise direction with respect to its initial position and which corresponds to the 6 o'clock position. In this position, a further section of separator material 8" is already being fed in and held by the holding devices 41" on the horizontal side wall located at the top. In the guide slot 47, the lead plate 2 with the separator material 8 folded around in the manner of a pocket is pressed by the wall section 49 against the inner wall of the guide slot 47, in the direction of the arrow F, in order to prevent the battery plate 2 and the separator material 8 falling out. The edge of the front side 3, projecting somewhat beyond the edge of the side wall, has already been folded at right angles, to be specific by the pusher 24 in FIG. 8. The free edge of the rear side 4 of the sleeve separator now projects outward, however. The welding device 44 is now moved in the direction of the arrow G with its folding arm 45 against the rotary table 10.

Figure 11:
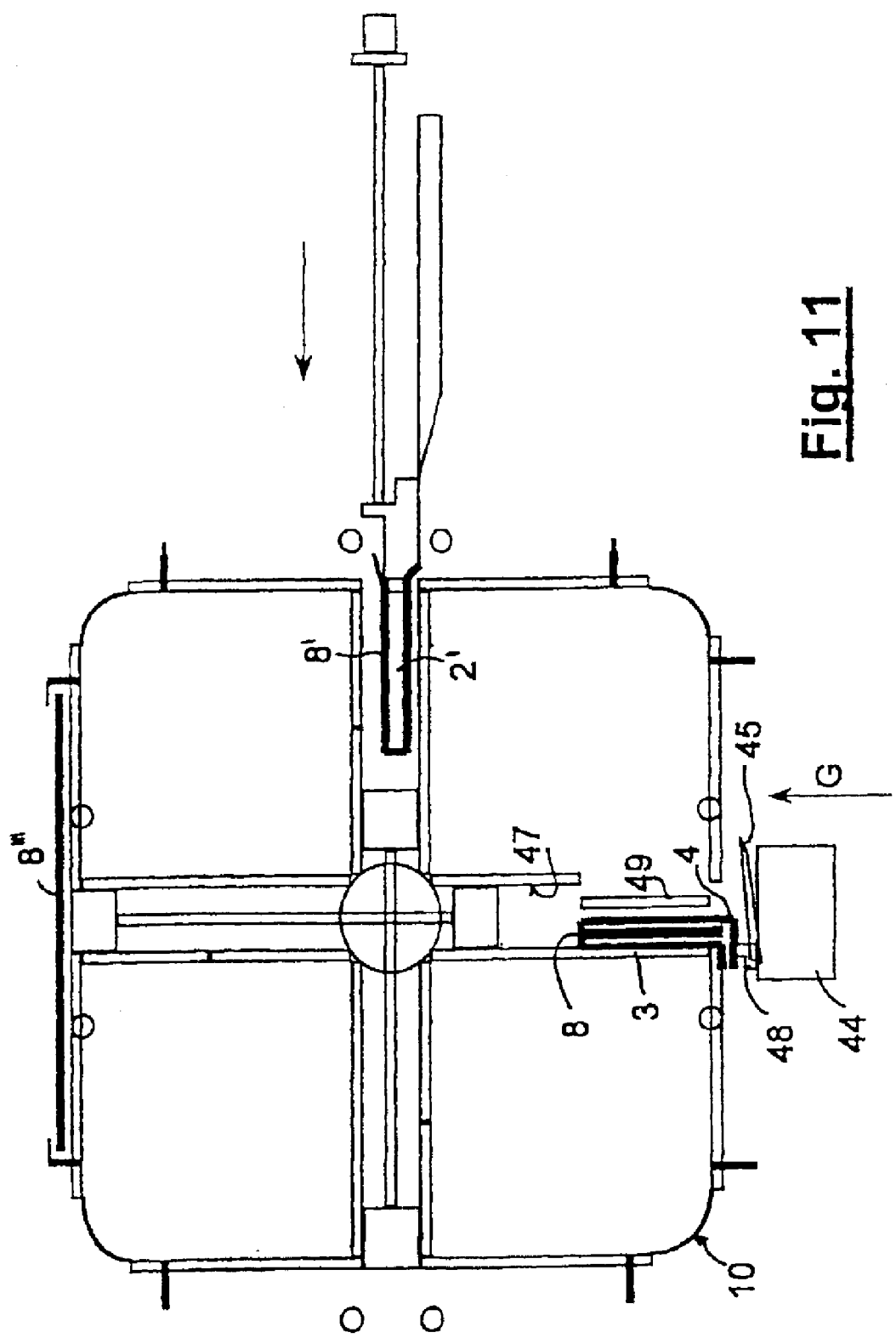

FIG. 11 shows the welding device 44 which has been moved against the rotary table 10 and whose folding arm 45 has previously folded over the free edge of the rear side 4 of the sleeve separator at right angles, so that a welding bar 48 can press the two edges of the separator material 8, projecting at right angles and to the left in the figure, against each other, in order to form the seam 7 illustrated in FIG. 1.

Figure 12:
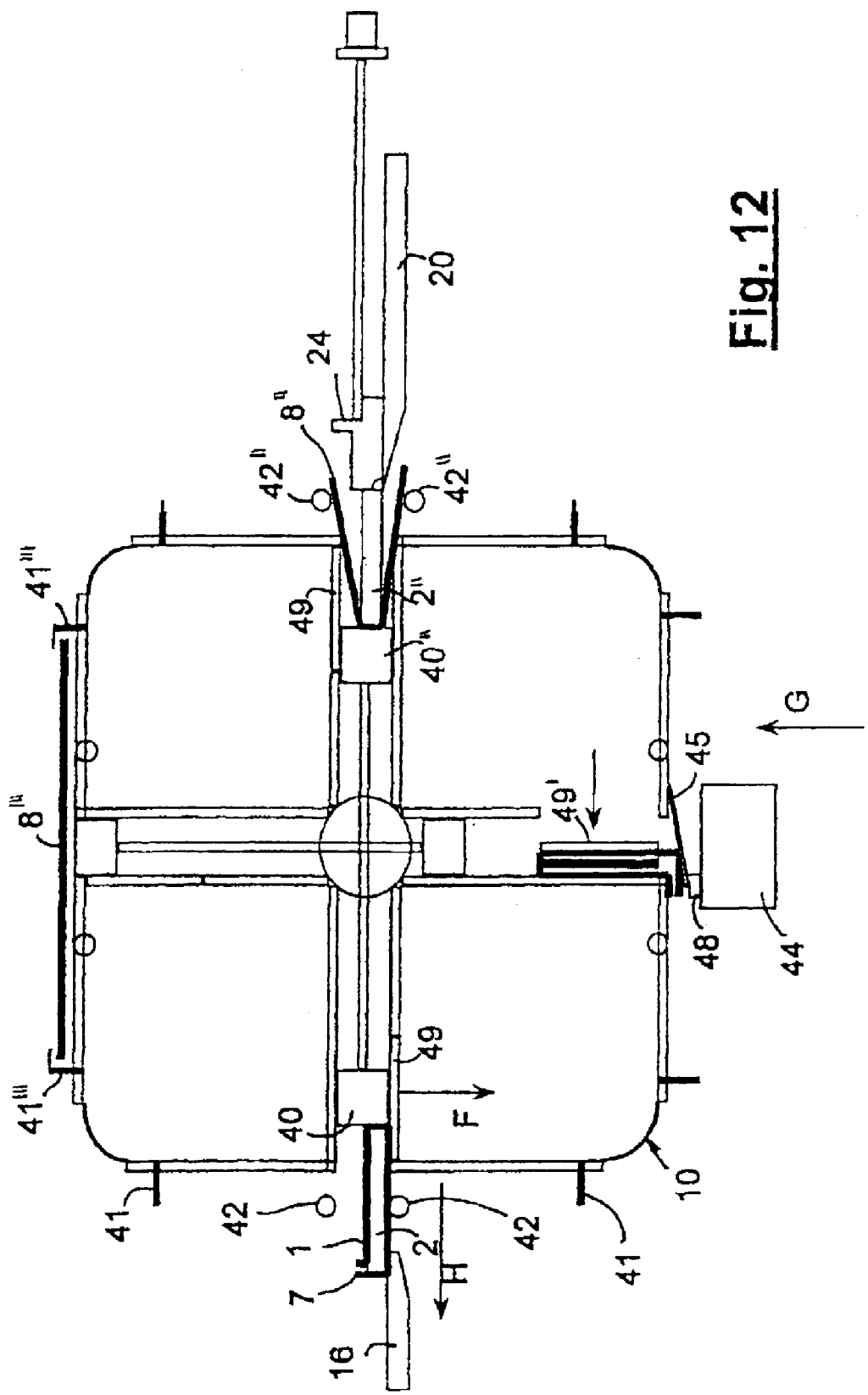

While the welding device 44 is sealing the sleeve separator in the 6 o'clock position of the rotary table, a further lead plate 2" is pushed into the separator material 8" in the 3 o'clock position according to FIG. 12, in order to form a further sleeve separator 1. At the same time, the first, finished sleeve separator 1 is located in the 9 o'clock position, with a wall section 49 moved back again in the direction of the arrow F'. In this position, the folding devices 42 are extended again and are used to support the sleeve separator 1 as it is expelled by the moveable central area 40 in the direction of the arrow H, by which means the finished sleeve separator 1 with enclosed lead plate 2 can be transferred to the conveyor device 16. At this time, a further section of separator material 8''' has already been fed to the 12 o'clock position of the rotary table 10 and firmly clamped by the holding devices 41'''.

It is pointed out that, in the case of mechanical crimping of the seam 7, a folding and sealing device would have to be provided instead of the welding device 44 in the 6 o'clock position of the rotary table 10. Although the crimping device (not illustrated) would again have to have a folding arm 45, a rack or a gear would have to be provided instead of the welding bar 48, interacting with a rack let into the side wall of the rotary table 10 and pressing the edges of the separator material 8. For this purpose, the rack would have to be arranged in each case along that edge of the guide slots 47 which lies opposite the moveable wall section 49.

What is claimed is:

1. A sleeve separator for a lead plate of a lead-acid accumulator, said lead plate having first side, a second side, a bottom edge and a top edge, said sleeve separator surrounding said first side and said second side and also the bottom edge and the top edge of the lead plate, wherein the separator at the top edge of the lead plate and surrounding said first side is folded away from the lead plate, projecting laterally from said first side approximately at right angles to said first side, and wherein the separator surrounding said second side is likewise folded at right angles over the top edge of the lead plate and likewise projects laterally from said second side, and wherein the two lateral projections rest on each other and are connected to each other by a seam.

2. The sleeve separator as claimed in claim 1, wherein the laterally projecting separator sections are connected to each other by welding.

3. The sleeve separator as claimed in claim 1, wherein the laterally projecting separator sections are connected to each other by mechanical crimping.

* * * * *